United States Patent [19]
Budd

[11] Patent Number: 5,918,058
[45] Date of Patent: Jun. 29, 1999

[54] ROUTING OF CLOCK SIGNALS IN A DATA PROCESSING CIRCUIT WITH A POWER SAVING MODE OF OPERATION

[75] Inventor: Graham Stephen Budd, Cambridge, United Kingdom

[73] Assignee: ARM Limited, Cambridge, United Kingdom

[21] Appl. No.: 08/804,113

[22] Filed: Feb. 20, 1997

[51] Int. Cl.[6] .................................................. G06F 1/32
[52] U.S. Cl. .................. 395/750.01; 395/311; 395/560; 395/750.03; 395/750.04; 395/750.06
[58] Field of Search ........................ 395/750.01, 750.02, 395/750.03, 750.04, 750.06, 750.05, 182.2, 311, 555, 556, 560; 327/544, 547, 565

[56] References Cited

U.S. PATENT DOCUMENTS

| | | | |
|---|---|---|---|
| 4,947,411 | 8/1990 | Shiraishi et al. | 377/47 |
| 5,025,387 | 6/1991 | Frame | 364/493 |
| 5,086,387 | 2/1992 | Arroyo et al. | 395/550 |
| 5,274,828 | 12/1993 | McAdams | 395/750.01 |
| 5,291,528 | 3/1994 | Vermeer | 375/106 |
| 5,361,290 | 11/1994 | Akiyama | 377/47 |
| 5,392,437 | 2/1995 | Matter et al. | 395/750.01 |
| 5,455,923 | 10/1995 | Kaplinsky | 395/481 |
| 5,669,003 | 9/1997 | Carmean et al. | 395/750.04 |
| 5,677,849 | 10/1997 | Smith | 395/750.06 |
| 5,696,953 | 12/1997 | Wong et al. | 395/560 |
| 5,708,771 | 1/1998 | Brandt et al. | 395/182.2 |
| 5,740,386 | 4/1998 | Miller et al. | 395/308 |
| 5,742,514 | 4/1998 | Bonola | 395/750.06 |
| 5,774,702 | 6/1998 | Mitsuishi et al. | 395/556 |
| 5,778,237 | 7/1998 | Yamamoto et al. | 395/750.04 |

*Primary Examiner*—Glenn A. Auve
*Assistant Examiner*—Xuan M. Thai
*Attorney, Agent, or Firm*—Nixon & Vanderhye P.C.

[57] ABSTRACT

The present invention provides a data processing circuit with a power saving mode of operation. The data processing circuit comprises a clock generator for generating a clock signal, and a plurality of clocked circuit elements. In accordance with the present invention, a main bus is arranged to provide the clock signal to the plurality of clocked circuit elements in a first mode of operation, and a power saving bus separate from the main bus is arranged to provide the clock signal to a subset of said plurality of clocked circuit elements in a power saving mode of operation. Further, a clock switcher circuit is provided for switching the clock signal to either the main bus or the power saving bus dependent on the mode of operation.

By this approach, the clock signal is routed only to the subset of circuit elements which require to be clocked in each mode of operation, and the length of bus routing and number of loads attached to the clock bus can be reduced for each operating mode, thus reducing the power consumption across all operating modes of the device.

13 Claims, 4 Drawing Sheets

ROUTING OF CLOCK SIGNALS IN A DATA PROCESSING CIRCUIT WITH A POWER SAVING MODE OF OPERATION

BACKGROUND OF THE INVENTION

1. Field of the Invention

The present invention relates to data processing apparatus, and in particular to data processing circuits that have one or more power saving modes of operation.

2. Description of the Prior Art

There is currently much interest in reducing the power consumption of data processing circuits, such as 'Application Specific Integrated Circuits' (ASICs). It is becoming more commonplace for these devices to be used in products which operate from battery power, such as portable laptop computers, mobile phones, personal organisers, etc. In such situations, it is clearly desirable to reduce the power consumption of these processing devices as much as possible, in order to improve the battery life of the products, i.e. the amount of time the products can be used for before needing to replace or recharge the batteries. However, it is not just in the area of battery powered products where power consumption is a concern, and there is generally a desire to reduce power consumption wherever possible.

To reduce the problems of power consumption, it is known to provide one or more power saving modes of operation into which the product may be placed in order to conserve battery power. As process technology improves, increasing levels of system functionality are being integrated into a single chip, with a corresponding increase in the number and complexity of such power saving modes. These are designed to allow the maximum system flexibility while aiming to reduce the average power consumption of the system.

Data processing circuits used in products of the above type typically contain a number of clocked circuit elements, which are supplied with a common clock signal by a clock bus. In a circuit where the reduction of power consumption is a key requirement, software or hardware controlled power saving modes have been developed to reduce the average power consumption.

With the known techniques, power consumption in each of the power saving modes is typically reduced by disabling circuit elements which are not in use by gating out the clock input at the circuit element. However, using this technique, the power dissipated in the main clock bus itself, due to the high capacitance being driven, will still be significant in all operating modes. FIG. 1 shows an example circuit, using this prior art technique to reduce power consumption. There are three operating modes (A, B and C) of which mode A corresponds to the whole circuit being active, and B and C require different combinations of the circuit elements to be clocked.

More specifically, in Mode A, all the circuit elements 115, 120, 125, 130, 135, 140, 145, 150 and 155 are arranged to receive a clock signal over clock bus 110 from the clock source 100. Each circuit element except for circuit element 120 has an AND gate at its input, one input of the AND gate receiving the clock signal from clock bus 110, and the other input receiving an enable/disable control signal. In Mode A, the control signal for all circuit elements has logic value '1', and hence each circuit element will be enabled to receive the clock signal from clock bus 110.

There are three control signal lines 160, 165, 170 used in the circuit illustrated in FIG. 1 to ensure that only the required circuit elements are clocked for each of the power saving modes B and C. Hence in mode B, the control signal line 160 provides a disable signal (logic value '0') to circuit elements 115, 125, 145 and 155, whereby those circuits are disabled by locally gating out the clock signal. Additionally, the control signal line 165 also provides a disable signal to circuit element 135, thereby disabling that circuit element. Hence, in mode B, only circuit elements 120, 130, 140 and 150 are clocked, although the clock signal has still been provided over the clock bus to each of the circuit elements in the circuit.

Similarly, in mode C, control signal lines 160 and 170 provide a logic value '0' signal to locally disable circuit elements 115, 125, 145, 155, 130, 140 and 150, leaving only circuit elements 120 and 135 operating in mode C.

Whilst the above technique clearly provides power saving modes of operation, by locally disabling clock signals in the unused circuit elements, the percentage of the total power consumption resulting from the driving of the main clock bus will still be significant.

Many circuits, particularly those intended for incorporation into portable products, are designed with the intent that the modes of operation used for the largest proportion of time will be power saving modes. In this case, it is particularly advantageous to reduce the power consumption in those power saving modes of operation.

Further, a single-chip will often contain one or more large custom macrocells which constrain the layout of the remaining logic to be spread over a large area, with an associated increase in the total length of clock bus routing. Also, pin out constraints may result in some circuit elements being physically located far from the clock source. These factors will generally increase the power consumption of the main clock bus.

Hence, it is an object of the present invention to provide a data processing circuit which exhibits improved power savings in all operating modes.

SUMMARY OF THE INVENTION

Accordingly, the present invention provides a data processing circuit, comprising: a first clock generator for generating a clock signal; a plurality of clocked circuit elements; a main bus arranged to provide said clock signal to said plurality of clocked circuit elements in a first mode of operation; a power saving bus separate from said main bus and arranged to provide said clock signal to a subset of said plurality of clocked circuit elements in a power saving mode of operation; and a clock switcher circuit for switching said clock signal to either said main bus or said power saving bus dependent on the mode of operation.

In accordance with the invention, a power saving mode of operation is defined in which only a subset of the total clocked circuit elements within the data processing circuit are used. A power saving bus, separate to the main bus, is then provided to route a clock signal to that subset of circuit elements. Then, if it is desired to enter the power saving mode, a clock switcher circuit is employed to switch the clock signal from the main bus to the power saving bus. By this approach, the main clock bus is not driven and therefore dissipates no power, and instead the clock signal is only routed to the circuit elements that actually require to be clocked in the power saving mode of operation. Depending on the position of the clocked circuit elements within the layout floorplan of the data processing circuit, this approach can result in a significant power saving, since the length of clock bus routing and the number of loads attached to the clock bus can be reduced for every operating mode in the design. The power savings achieved using this approach become greater as the number of power saving modes and complexity of the circuit layout increase.

In preferred embodiments, the circuit further comprises a logical OR gate associated with each of said circuit elements in said subset, said circuit elements in said subset having a clock input line connected to an output of said associated logical OR gate, and inputs of said logical OR gate being connected to said main and said power saving bus, whereby the output of the logical OR gate is arranged to provide on said clock input line the clock signal provided on either said main or said power saving bus. Each of the circuit elements in the subset are connected to both the main bus and to the power saving bus, and hence have two sources from which they may receive the clock signal. However, the clock switcher circuit ensures that these two sources of clock signals are mutually exclusive to one another, and the provision of a logical OR gate at the clock input to the circuit element then ensures that the circuit element will be clocked irrespective of whether the clock signal is being provided on the main bus or on the power saving bus. Since the clock switcher circuit ensures that only one of the main bus or power saving bus will provide a clock signal, an XOR gate can be used instead of an OR gate connected to the input of the circuit elements. Further, in alternative embodiments of the present invention, the default inactive state of the clock buses may be a logic "1" level, in which case an AND gate would be used instead of the OR gate.

The present invention may also be used to reduce the power consumption of more than one power saving mode of operation. The most significant power savings will typically be realised when the invention is used in this way. In accordance with preferred embodiments of the present invention, the data processing circuit further comprises a plurality of power saving buses for use in a plurality of power saving modes of operation, each power saving bus being arranged to provide said clock signal to a particular subset of said plurality of clocked circuit elements. By this approach, a separate bus can be provided for each application-specific mode of operation to route a clock signal only to the circuit elements required by each application-specific mode of operation. The clock switcher circuit can then be used to switch the clock signal between the various buses.

In preferred embodiments, a separate bus is provided for each power saving mode of operation defined, and the clock switcher circuit is arranged to switch the clock signal to either the main bus or one of the power saving buses. However, it is possible that the power saving mode of operation can be defined in which the clock signal is provided on two or more of the buses. For example, consider the situation in which a data processing circuit has circuit elements A to Z, a first power saving mode requires only circuit elements A and B to be clocked, and a second power saving mode requires only circuit elements C and D to be clocked. Then, if desired, a third power saving mode of operation may be defined in which circuit elements A, B, C and D are clocked by providing the clock signal on the two buses that correspond to the first and second modes of operation, respectively. Hence, the clock switcher circuit may be arranged to switch the clock signal to either the main bus, or to a plurality of the power saving buses.

When a power saving mode of operation is entered, and the clock switcher circuit switches the clock signal from the main bus to the appropriate power saving bus, then, without any intervention, the clock signal on the power saving bus will be identical in form to the clock signal that had been provided on the main bus prior to entering that power saving mode of operation. This may be perfectly satisfactory in most situations. However, it is also possible when switching the clock signal from the main bus to the power saving bus to provide additional circuitry to, for example, adjust the frequency of the clock signal. In preferred embodiments, the data processing circuit comprises a clock frequency adjusting circuit connected to said power saving bus for adjusting the frequency of the clock signal provided on said power saving bus. Typically, the clock frequency adjusting circuit will be used to reduce the frequency of the clock signal used in the power saving mode of operation, since a lower frequency clock signal will consume less power than a higher frequency clock signal. In such cases it is preferable for the clock frequency adjusting circuit to be located in proximity to said clock switcher circuit. Since power consumption increases as the frequency of the clock signal increases, so placing the frequency adjusting circuit close to the switcher circuit will enable the power consumption to be further reduced.

By providing some mechanism for providing a different clock signal on the power saving bus, it is possible for the power saving bus to provide a clock signal having a reduced frequency, and therefore not consuming as much power as a higher frequency clock signal used in the first, non power saving, mode of operation. This will result in increased power savings.

Rather than using a clock frequency adjusting circuit to alter the frequency of the signal used in a power saving mode of operation, it is possible to use such a clock frequency adjusting circuit to alter the frequency of the clock signal applied to particular circuit elements, irrespective of the mode of operation. Hence, the data processing circuit may further comprise a main clock frequency adjusting circuit for adjusting the frequency of the clock signal provided to a number of said circuit elements.

In many designs, some circuit elements will require to be clocked at lower frequencies than other circuit elements, and the use of a main clock frequency adjusting circuit as discussed above enables those circuit elements to be clocked at the correct frequencies.

In preferred embodiments, said main clock frequency adjusting circuit is connected to said main clock bus and is arranged to provide said frequency adjusted clock signals to a number X of said circuit elements. If only a subset Y of those X circuit elements are to be clocked in a power saving mode of operation, it is possible to continue clocking the main frequency adjusting circuit, but this means that the whole of the main frequency adjusting circuit must be clocked, even if only one of the divided down clock frequency signals is required for the subset Y of the circuit elements.

To avoid this, in preferred embodiments, where the subset Y of circuit elements to be clocked require only a subset of the available clocks from the main clock frequency adjusting circuit, the data processing circuit further comprises a secondary clock frequency adjusting circuit of reduced complexity connected to said power saving bus and arranged to provide a subset of said frequency adjusted clock signals to a subset Y of said X circuit elements. By providing a secondary clock frequency adjusting circuit just to produce the frequency adjusted clock signal(s) required by the Y circuit elements clocked in the power saving mode, and then by switching the clock over from the main clock bus to the power saving bus as previously described, further power savings are achieved, assuming that the secondary clock frequency adjusting circuit consumes less power than the main clock frequency adjusting circuit.

It should be noted that the use of two separate clock frequency adjusting circuits as discussed above is suitable if the circuit elements being clocked are not sensitive to any phase shift that may result from switching between the clock frequency adjusting circuits. If the circuit elements are sensitive to such phase shifts, then it may be appropriate to maintain just one clock frequency adjusting circuit, and to route the power saving bus via that clock frequency adjusting circuit.

Preferably, the main and secondary clock frequency adjusting circuits are clock divider circuits, but it will be appreciated by those skilled in the art that any suitable circuit for altering the clock frequency could be used.

Viewed from a second aspect, the present invention provides a method of operating a data processing circuit, comprising the steps of: generating a clock signal; selecting a mode of operation of the data processing circuit; switching said clock signal to a main bus in a first mode of operation, the main bus being arranged to provide said clock signal to a plurality of clocked circuit elements within said data processing circuit; switching said clock signal to a power saving bus separate from said main bus in a power saving mode of operation, the power saving bus being arranged to provide said clock signal to a subset of said plurality of clocked circuit elements.

In preferred embodiments, the step of selecting a mode of operation comprises the steps of: detecting a predetermined state of the circuit; determining a mode of operation associated with said predetermined state; and issuing a signal to a clock switcher circuit to cause said clock switcher circuit to route said clock signal to the bus corresponding to the determined mode of operation.

BRIEF DESCRIPTION OF THE DRAWINGS

An embodiment of the invention will be described hereinafter, by way of example only, with reference to the accompanying drawings in which like reference signs are used for like features, and in which.

DESCRIPTION OF A PREFERRED EMBODIMENT

In accordance with preferred embodiments of the present invention, a data processing circuit is provided with a set of dedicated clock buses, one associated with each operating mode of the data processing circuit. Further, each clock bus is only routed to the circuit elements which are required to be active in the appropriate operating mode, and each circuit element has one clock input for each operating mode in which it is intended to be active. An example of a data processing circuit arranged to implement a power saving technique in accordance with preferred embodiments of the present invention is illustrated in FIG. 2, and the operation of the data processing circuit illustrated in FIG. 2 will now be discussed.

Figure 1:
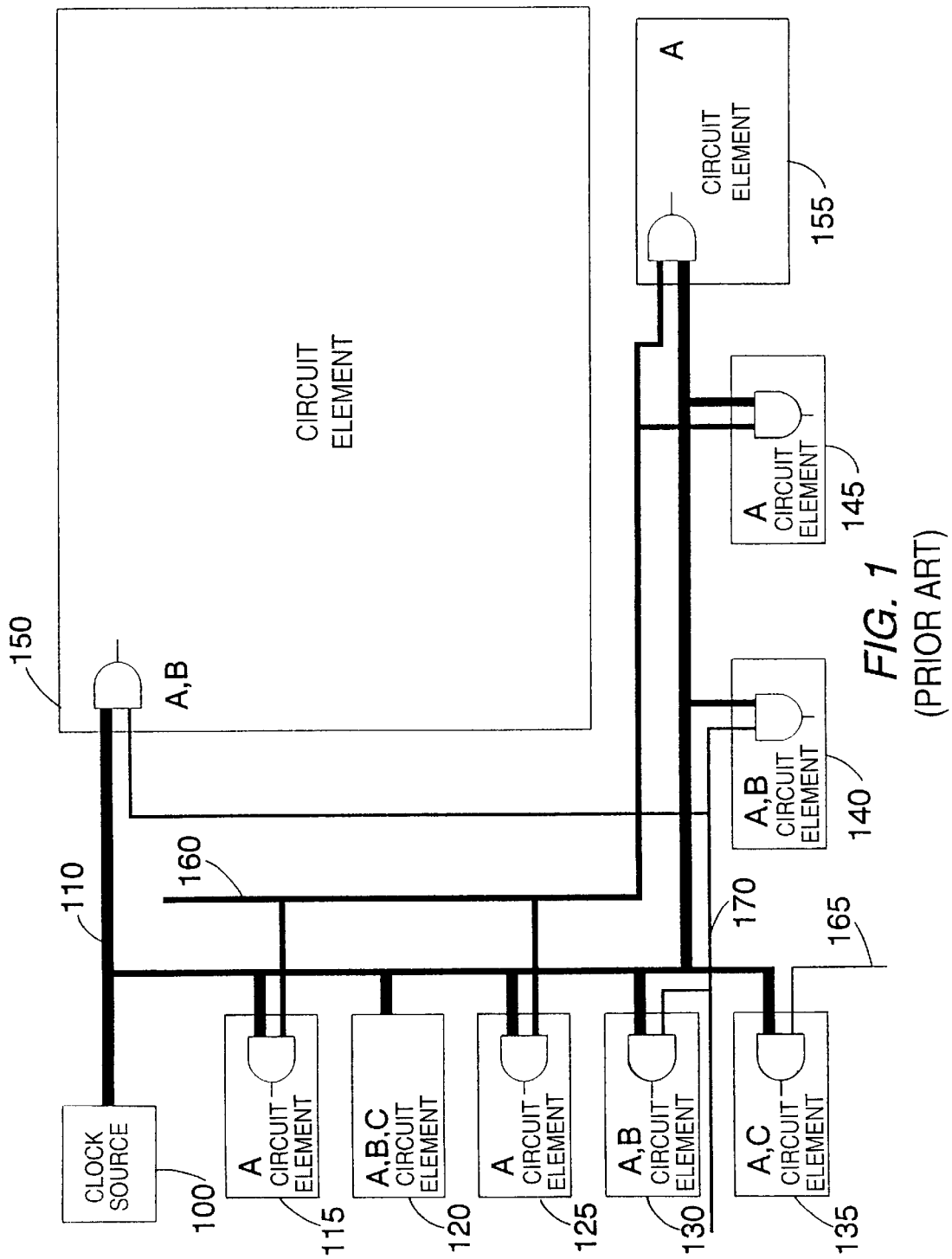
FIG. 1 illustrates a prior art technique used to provide power saving modes of operation in a data processing circuit having a number of clocked circuit elements.
Figure 2:
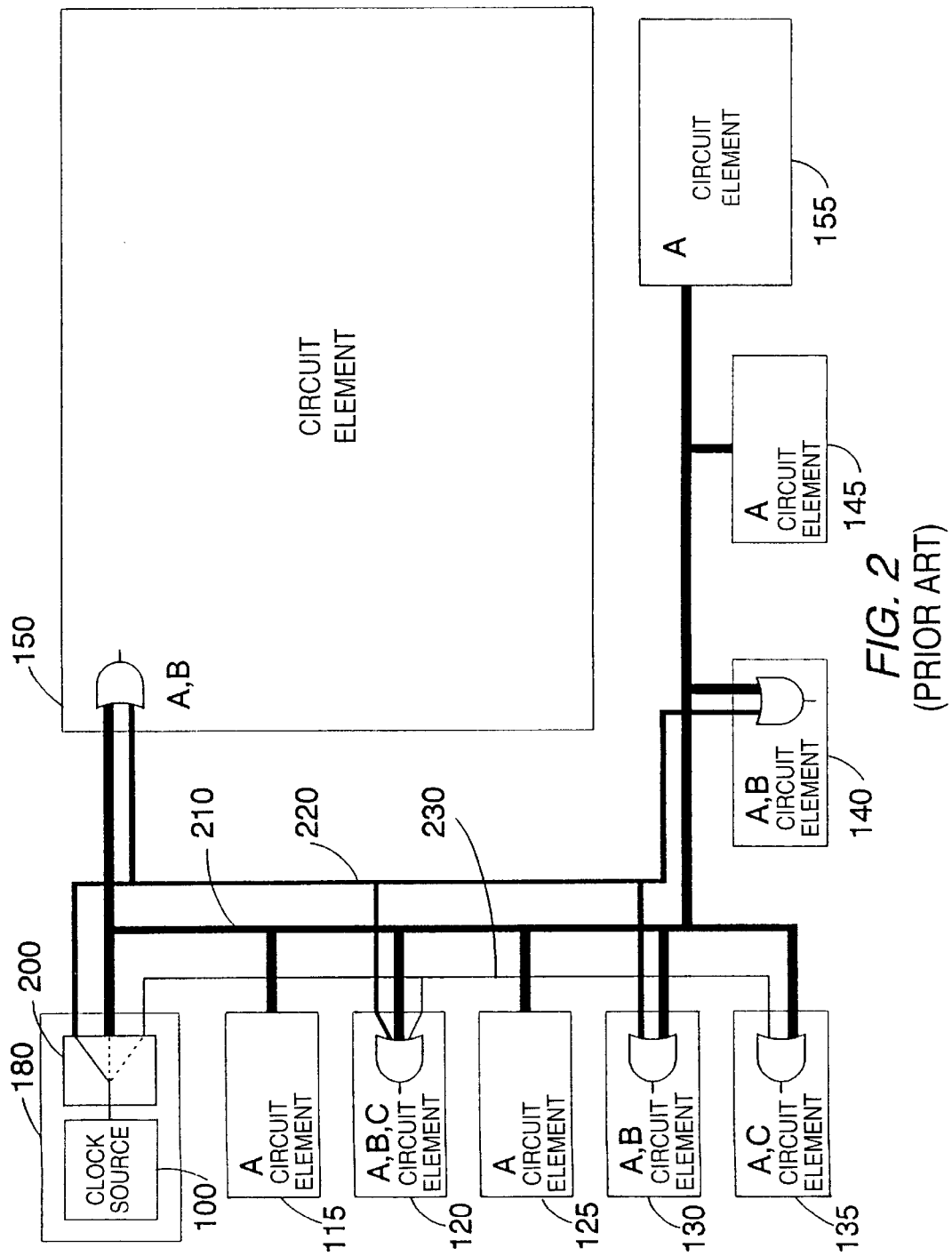
FIG. 2 illustrates a data processing circuit which implements a power saving technique in accordance with preferred embodiments of the present invention.

The data processing circuit illustrated in FIG. 2 has the same circuit elements as the prior art data processing circuit illustrated in FIG. 1. However, as will be discussed in more detail below, these circuit elements 115, 120, 125, 130, 135, 140, 145, 150 and 155 do not have AND gates at their input, and are not arranged to receive enable/disable control signals. Instead, a separate clock bus is provided for each mode of operation of the data processing circuit. In the embodiment illustrated in FIG. 2, the data processing circuit has three different modes of operation A, B, C, and hence three separate clock buses 210, 220, 230. Mode A corresponds to the whole circuit being active, whilst modes B and C are power saving modes of operation which require different combinations of the circuit elements to be clocked.

The circuit elements may be any circuit elements that need to be clocked, but in preferred embodiments they are 'peripherals', such as an LCD controller, timers, a DRAM controller, a UART, etc.

The clock bus 210 corresponding to the operating mode A is arranged to route a clock signal to all of the peripherals 115, 120, 125, 130, 135, 140, 145, 150 and 155, since all of these peripherals are required to be clocked in the operating mode A. However, the clock bus 220 corresponding to operating mode B is arranged to only route the clock signal to those peripherals 120, 130, 140 and 150 which are intended to be active in the operating mode B. Similarly, the clock bus 230 is arranged to only route the clock signal to the peripherals 120 and 135, which are the only two peripherals intended to be active in the operating mode C.

As is apparent from FIG. 2, this arrangement will typically result in at least some of the peripherals being connected to more than one clock bus. However, the clock signal generated by the clock source 100 is passed to a switch 200, prior to being routed on to any of the three buses 210, 220 and 230. In preferred embodiments, the clock source 100 and switch 200 are provided by a clock generation and state control module 180. The switch 200 is arranged to switch the clock signal to only one of the three clock buses at any given time. Hence, any given peripheral can only receive one clock signal at any particular time, and all that is required is for those peripherals connected to more than one clock bus to incorporate an OR gate function at their clock input in order to ensure that a clock signal on any of the clock buses connected to that peripheral will result in the peripheral being clocked. Hence, with reference to FIG. 2, peripherals 120, 130, 135, 140 and 150 will each include an OR gate function to receive the inputs from the clock buses connected to those peripherals.

This approach enables a reduction in the length of clock bus routing for any particular mode of operation, and a reduction of the number of loads attached to each clock bus, and hence reduces the power consumption associated with the distribution of clocks in all of the operating modes. In particular, the undesirable power consumption resulting from the clocking of the entire main clock bus that is experienced in data processing circuits that use the prior art technique illustrated earlier with reference to FIG. 1 is reduced since, in any particular mode of operation, only the required secondary, or power saving, bus will be clocked. Hence, it will be apparent that the approach described with reference to FIG. 2 will result in increased power savings over those available using the prior art techniques, at the expense of a small amount of additional die area. The actual magnitude of the power saving achieved will be dependent on the physical position of the circuit elements on the die, the number of circuit elements connected to each bus in each mode, and the average time that the circuit spends in each of its operating modes.

Figure 3:
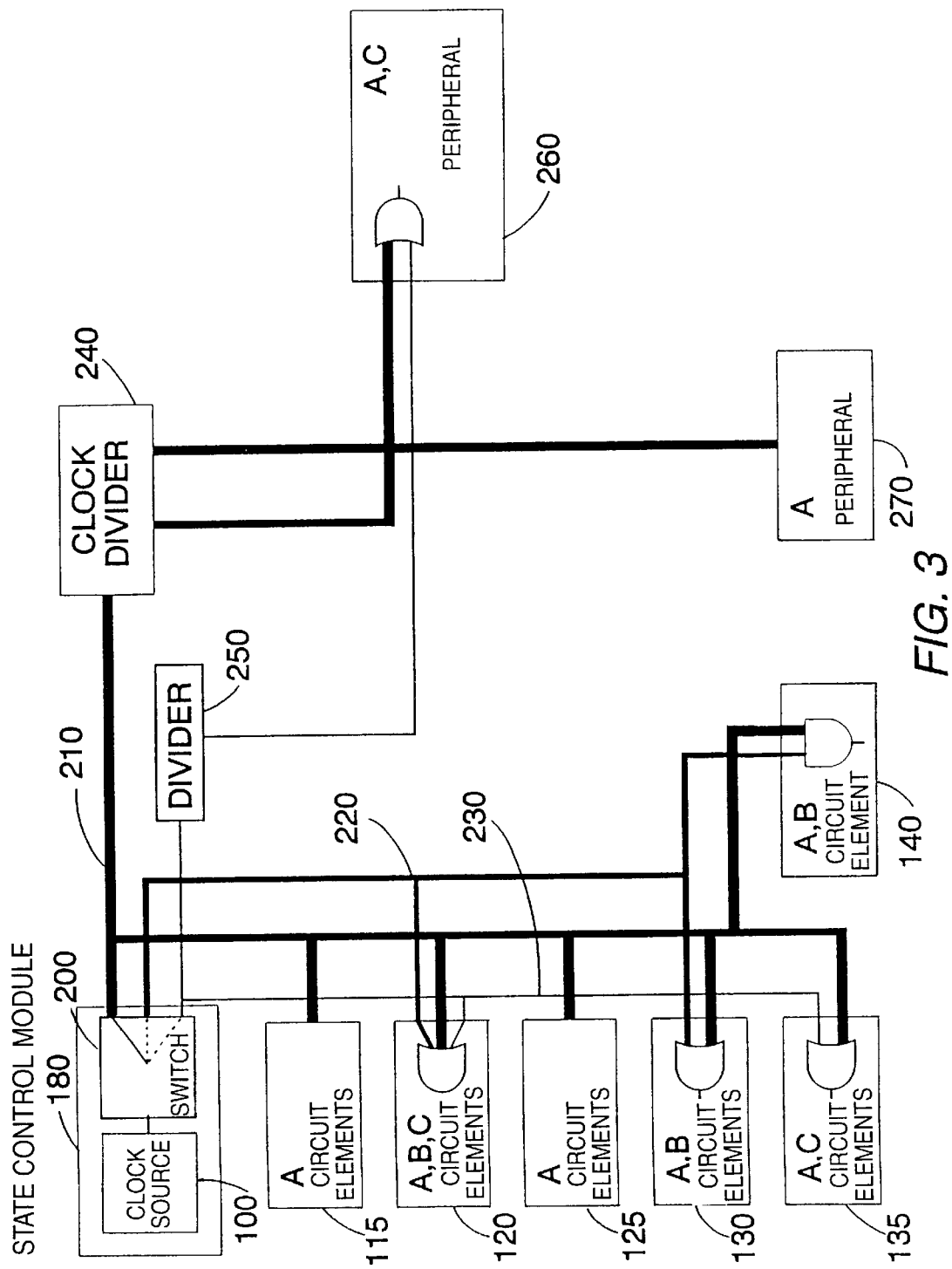
FIG. 3 illustrates how the derivative frequency clock signals may be controlled in different modes of operation within a data processing circuit in accordance with preferred embodiments of the present invention.

Many circuit designs will require clocks for peripherals to be available at lower frequencies than the main bus clock. This can be achieved by using local dividers associated with the peripherals that require the lower frequency clock, or, to save power, a centralised clock divider can be used. A circuit including such a centralised clock divider is illustrated in FIG. 3. The data processing circuit in FIG. 3 includes the peripherals 115, 120, 125, 130, 135 and 140 included in the data processing circuit of FIG. 2, but also includes additional peripherals 260 and 270. In operating mode A, all of the peripherals are clocked, but a clock divider 240 is provided to alter the frequency of the clock signal provided to peripherals 260 and 270. In the example illustrated in FIG. 3, the clock divider 240 may be a 5 bit synchronous counter that is used to produce a 'divide by 3' and a 'divide by 30' signal, such that the peripheral 270 will receive a divide by 30 clock signal and the peripherals 260 will receive a divide by 3 clock signal.

Since peripherals 260 and 270 do not need to be clocked in the power saving mode of operation B, then the clock bus 220 used in the operating mode B can bypass the clock divider 240, thereby saving further power by enabling the whole of the main clock divider circuit to be shut down during the power saving mode B.

In power saving mode of operation C, the peripheral 260 is required to be clocked. However, assuming that the phase of the divided down clock signal does not need to be maintained across the switching boundary, a copy of a small part of the divider chain can be replicated as a separate divider clement near the source of the appropriate clock bus, but remaining disabled except when the circuit is in the power saving mode C. The phase will not generally be maintained because the small divider element will only start counting when enabled in power saving mode C. It will start counting from zero when enabled, but the main divider 240 may not have had this count value at the point the switch transferred the clock signal to clock bus 230. This results in a one-off phase variation when switching between the main divider and the small divider element, and vice versa.

The small part of the divider chain is illustrated in FIG. 3 by the divider element 250, and it will be appreciated by those skilled in the art that this smaller divider will consume less power than the main clock divider 240. Therefore, it is clearly beneficial, where possible, to provide such a "trimmed down" divider 250, rather than having the clock bus 230 routed via the main clock divider 240. Hence, in power saving mode of operation C, the clock bus 230 is arranged to provide the clock signal to both the peripheral 135 and the small divider circuit 250, the small divider circuit 250 being arranged to produce a divide by 3 clock signal at its output, which is then provided to the peripheral 260. This removes the necessity for the main clock divider 240 to be clocked in order to produce the reduced frequency clock signal for peripheral 260, and therefore provides an improved power saving, over and above that already achieved by using the arrangement of separate buses for each operating mode. Further, the small, mode-specific divider circuit 250 can usually be sited closer to the clock source than the relevant parts of a larger central clock divider 240, and therefore clock skew and loading can be more finely controlled. Also, since lower frequency signal require less power, then the closer the divider circuit is to the clock source, the greater the power savings achieved.

Figure 4:
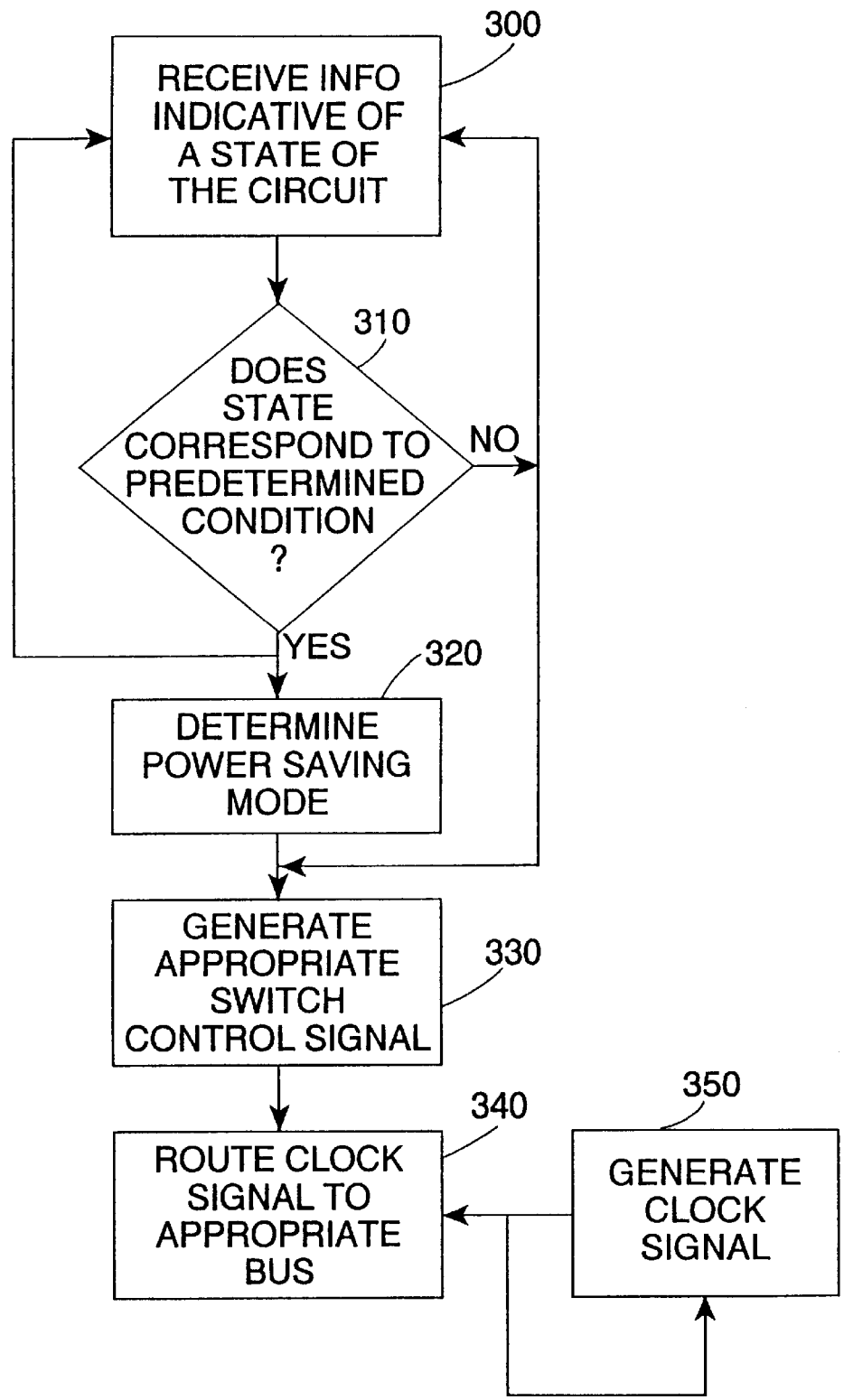
FIG. 4 is a flow diagram illustrating the technique used to operate a data processing circuit in accordance with preferred embodiments of the present invention.

The technique of the preferred embodiment will now be illustrated further with reference to FIG. 4, which is a flow diagram illustrating the process performed to operate a data processing circuit in accordance with preferred embodiments. At step 300, the process awaits information indicative of the state of the circuit. This information may take a number of different forms. For instance, a user of the product incorporating the circuit may press a button indicating that the product should be placed in a power saving mode. Alternatively, the circuit may include an element arranged to monitor inputs by the user, and to produce a signal if 110 inputs have been received after a predetermined time, this signal indicating that the circuit should be placed into a power saving mode.

Additionally, in most cases, the part of the circuit responsible for receiving information about the state of the system, generating the state information and analysing it is a microprocessor core incorporated into the system, this core being arranged to run a predetermined software program, with the support of additional circuitry, to actually implement the power saving modes. The microprocessor core will execute an instruction causing entry into the power saving mode when certain conditions are met.

Once information indicative of the state of the circuit has been received, at step 310 it is determined whether the state corresponds to a known predetermined state. For example, the central processing unit of the data processing circuit may execute a software routine which compares the state of the system with a predetermined condition for entry into a power saving mode. If the information received by the central processing unit at step 310 corresponds to a predetermined condition for entering a power saving mode, then the software will be designed to determine, at step 320, which power saving mode of operation corresponds to that predetermined condition of the system. Once the power saving mode has been determined, then an appropriate switch control signal is generated by the central processing unit at step 330, this switch control signal causing the switch 200 to route the clock signal to the appropriate power saving bus.

If, at step 310, it is determined that the state information received at step 300 does not correspond to one of the predetermined conditions, then the process moves directly to step 330. Here, an appropriate switch control signal is generated to cause the switch 200 to route the clock signal to the main bus, since if the state does not correspond to any of the predetermined conditions, it is assumed that a power saving mode of operation should not be entered, and hence all of the peripherals should be clocked.

The switch control signal generated at step 330 is used at step 340 by the switch 200 to route the clock signal to the appropriate bus, the clock signal being generated at step 350 and then supplied to the switch 200 for routing at step 340.

From the above description, it will be appreciated that the provision of separate, dedicated, clock buses for each operating mode of the circuit generally enables the power consumption for all operating modes to be reduced. Each clock bus is routed only to the peripherals which are required to be active in the appropriate operating mode, and hence no power is wasted in driving non-essential clock bus capacitance. As peripherals are often required to operate in more than one mode, each peripheral has one clock input for each operating mode in which it is intended to be active, and these inputs are connected together by a logical OR function at the main input to the peripheral. On changing from one operating mode to another, the main clock signal is switched exclusively to the appropriate clock bus for that mode. This implementation results in the power consumption of all of the operating modes being reduced (at the expense of a small amount of additional die area), as the length of clock bus routing driven and the number of loads attached to the driven clock bus is reduced.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing circuit, comprising:

a clock generator for generating a clock signal;

a plurality of clocked circuit elements;

a main bus arranged to provide said clock signal to said plurality of clocked circuit elements in a first mode of operation;

a power saving bus separate from said main bus and arranged to provide said clock signal to a subset of said plurality of clocked circuit elements in a power saving mode of operation; and a clock switcher circuit for switching said clock signal to either said main bus or said power saving bus dependent on the mode of operation, whereby in said power saving mode of operation said clock signal is not driven onto said main bus.

2. A data processing circuit as claimed in claim 1, further comprising a plurality of power saving buses for use in a plurality of power saving modes of operation, each power saving bus being arranged to provide said clock signal to a particular subset of said plurality of clocked circuit elements.

3. A data processing circuit as claimed in claim 2, wherein said clock switcher circuit is arranged to switch the clock signal to either said main bus or one of said power saving buses.

4. A data processing circuit as claimed in claim 2, wherein said clock switcher circuit is arranged to switch the clock signal to either said main bus, or a plurality of said power saving buses.

5. A data processing circuit as claimed in claim 1, further comprising a clock frequency adjusting circuit connected to said power saving bus for adjusting the frequency of the clock signal provided on said power saving bus.

6. A data processing circuit as claimed in claim 5, wherein the clock frequency adjusting circuit is located in proximity to said clock switcher circuit.

7. A data processing circuit as claimed in claim 1, further comprising a main clock frequency adjusting circuit for adjusting the frequency of the clock signal provided to a number of said circuit elements.

8. A data processing circuit as claimed in claim 7, wherein said main clock frequency adjusting circuit is connected to said main bus and is arranged to provide said frequency adjusted clock signal to a number X of said circuit elements.

9. A data processing circuit as claimed in claim 8, further comprising a secondary clock frequency adjusting circuit connected to said power saving bus and arranged to provide said frequency adjusted clock signal to a subset Y of said X circuit elements.

10. A data processing circuit as claimed in claim 9, wherein said main and said secondary clock frequency adjusting circuits are clock divider circuits.

11. A data processing circuit comprising:

a clock generator for generating a clock signal;

a plurality of clocked circuit elements;

a main bus arranged to provide said clock signal to said plurality of clocked circuit elements in a first mode of operation;

a power saving bus separate from said main bus and arranged to provide said clock signal to a subset of said plurality of clocked circuit elements in a power saving mode of operation; and a clock switcher circuit for switching said clock signal to either said main bus or said power saving bus dependent on the mode of operation, whereby in said power saving mode of operation said clock signal is not driven onto said main bus, further comprising a logical OR gate associated with each of said circuit elements in said subset, said circuit elements in said subset having a lock input line connected to an output of said associated logical OR gate, and inputs of said logical OR gate being connected to said main and said power saving bus, whereby the output of the logical OR gate is arranged to provide on said clock input line the clock signal provided on either said main or said power saving bus.

12. A method of operating a data processing circuit, comprising the steps of:

generating a clock signal;

selecting a mode of operation of the data processing circuit;

switching said clock signal to a main bus in a first mode of operation, the main bus being arranged to provide said clock signal to a plurality of clocked circuit elements within said data processing circuit;

switching said clock signal to a power saving bus separate from said main bus in a power saving mode of operation, the power saving bus being arranged to provide said clock signal to a subset of said plurality of clocked circuit elements, whereby in said power saving mode of operation, said clock signal is not driven onto said main bus.

13. A method as claimed in claim 12, wherein said step of selecting a mode of operation comprises the steps of:

detecting a predetermined state of the circuit;

determining a mode of operation associated with said predetermined state; and issuing a signal to a clock switcher circuit to cause said clock switcher circuit to route said clock signal to the bus corresponding to the determined mode of operation.

* * * * *